March 8, 1966  G. L. CAMPBELL  3,239,254
PIPE COUPLING
Filed Feb. 18, 1965  3 Sheets-Sheet 1
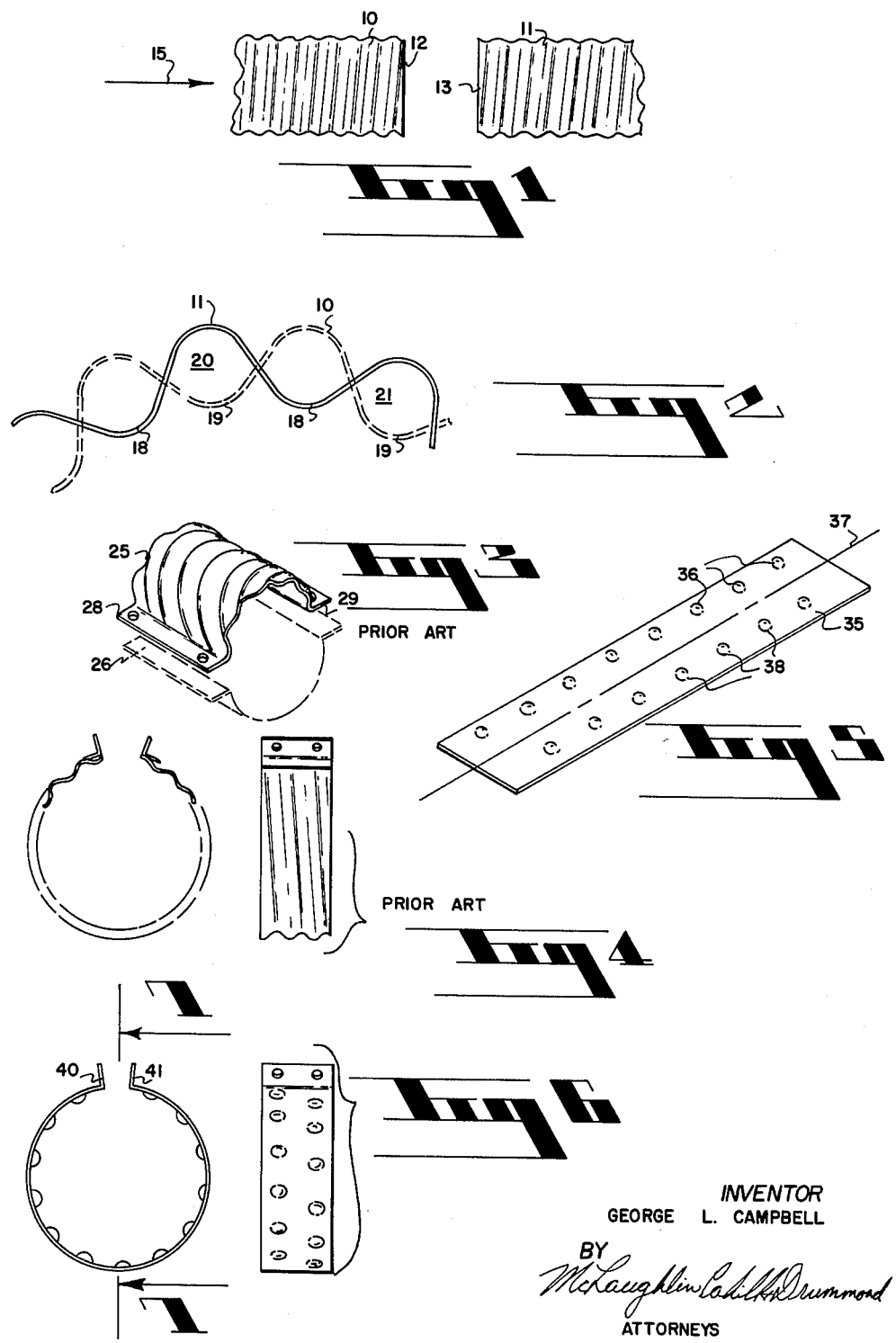
INVENTOR
GEORGE L. CAMPBELL
BY
ATTORNEYS

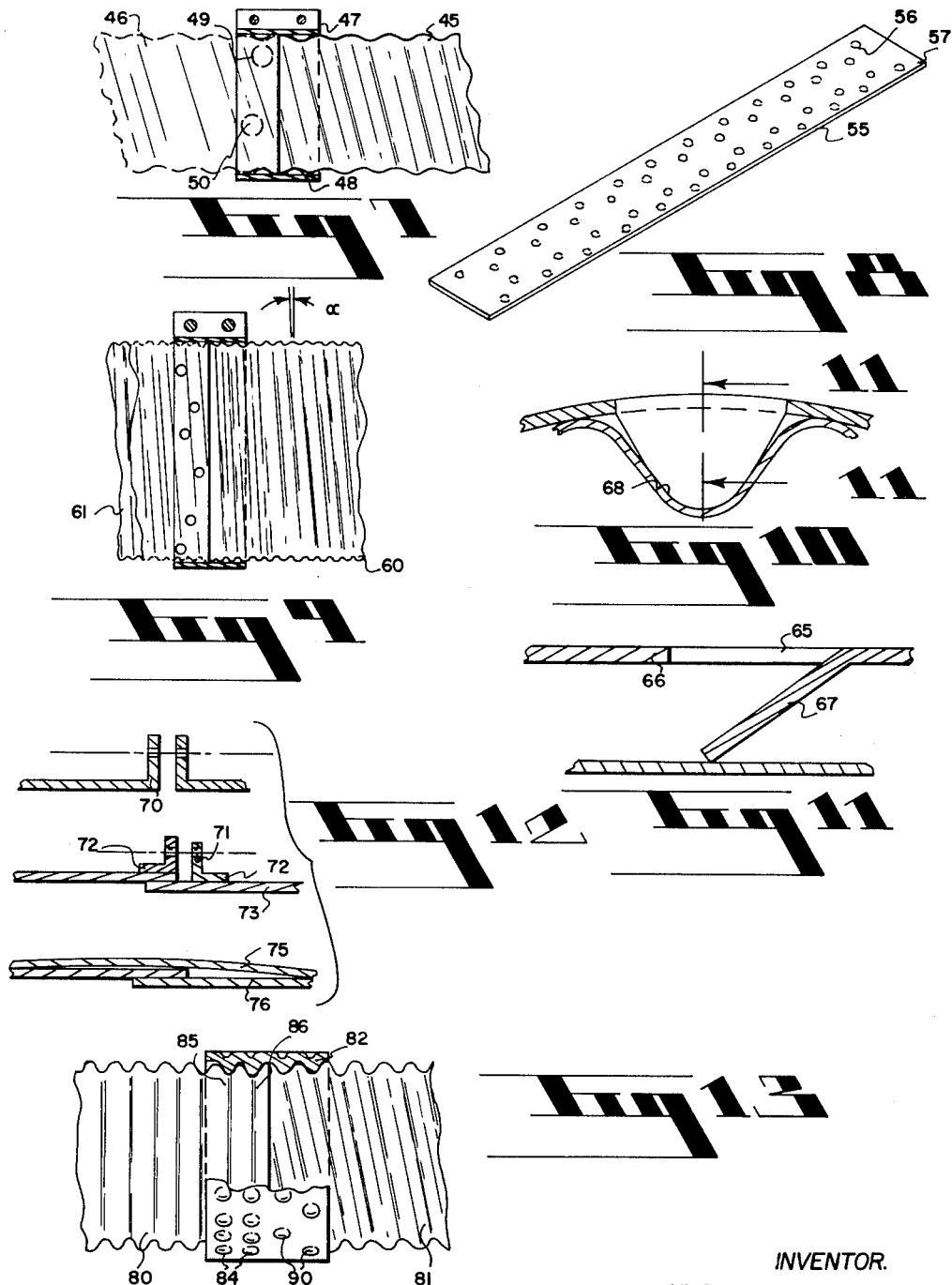

March 8, 1966  G. L. CAMPBELL  3,239,254
PIPE COUPLING
Filed Feb. 18, 1965  3 Sheets-Sheet 3
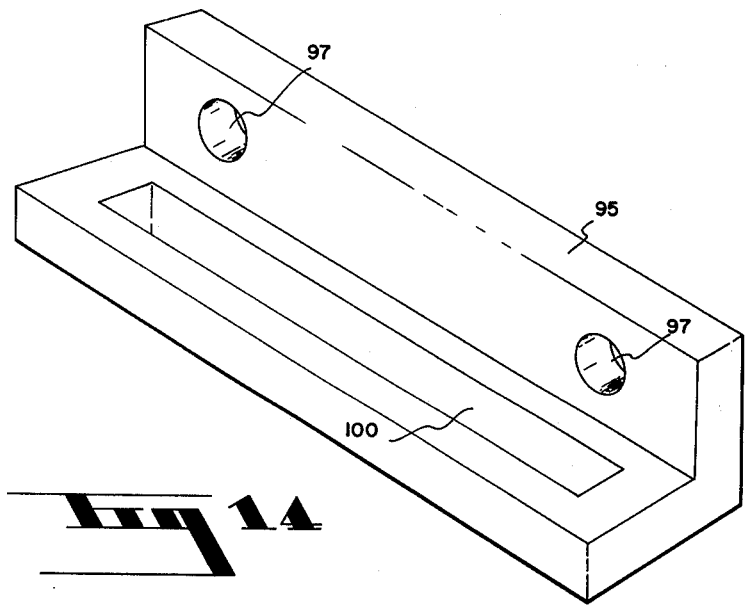
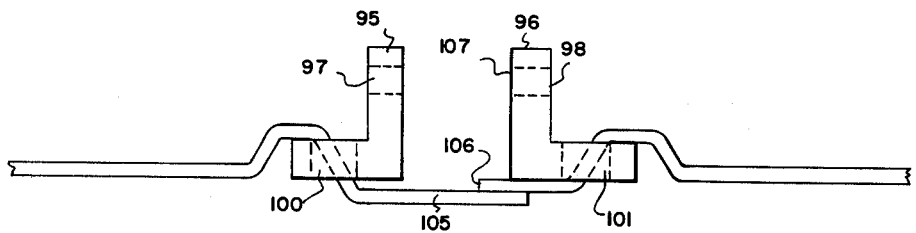
INVENTOR.
GEORGE L. CAMPBELL
BY
ATTORNEYS

United States Patent Office 3,239,254
Patented Mar. 8, 1966

3,239,254
PIPE COUPLING
George L. Campbell, Phoenix, Ariz., assignor to
Garland Steel Company
Filed Feb. 18, 1965, Ser. No. 437,624
4 Claims. (Cl. 285—390)

This application is a continuation-in-part of patent application S.N. 426,907, filed January 21, 1965, now abandoned.

The present invention pertains to pipe couplings, and more specifically, to couplings of the type used for joining sections of corrugated pipe.

The use of corrugated pipe has increased in recent years, particularly in view of new applications and modifications in the structure of the pipe itself. Most applications of corrugated pipe require that the pipe convey water without gross leakage; that is, while the pipe need not be water-tight, it nevertheless must not permit water to leak or flow out through a joint at such a volume and velocity as to cause undue settling or erosion of the soil surrounding the pipe. Pipe joints must not, therefore, be a source of leakage and must provide sufficient strength to maintain the proper alignment of the joined pipe sections throughout the life of the pipe. An additional complicating factor has been presented through the advent of helically corrugated pipe. Older types of corrugated pipe were generally annularly corrugated and could thus be butted to be joined. In butting helically corrugated pipe, an additional difficulty exists since it becomes necessary to align the trough in the corrugations to prevent gross flow at the joint. To supply the requirements of most applications of corrugated pipe, prior art couplings are bulky, relatively rigid, and difficult to handle, requiring substantial labor time for installation. Further, prior art couplings are incapable of joining a section of the older type of corrugated pipe (annularly corrugated) with a section of more modern corrugated pipe (helically corrugated).

It is therefore an object of the present invention to provide a coupling for joining corrugated pipe that is more easily installed than prior art couplings.

It is also an object of the present invention to provide a pipe coupling for corrugated pipe that is more easily and less expensively manufactured.

It is also an object of the present invention to provide a pipe coupling for corrugated pipe that, because of its configuration and lack of corrugations, is less rigid than prior art couplings and therefore more readily installed.

It is still another object of the present invention to provide a pipe coupling for joining annularly corrugated pipe to helically corrugated pipe.

These and other objects of the present invention will become apparent to those skilled in the art as the description thereof proceeds.

Briefly, in accordance with one embodiment of the present invention, a pipe coupling is provided in the form of a rectangular band of semi-rigid material. The material can be conventional galvanized steel and is of substantially greater flexibility than prior art couplings since the band is not corrugated. A first series of indentations is provided parallel to one edge of the band, the indentations being of a depth and diameter appropriate to mate with the trough of the corrugated pipe with which it is to be used. A second series of indentations, similar to the first, is provided in axially spaced relation from the first series of indentations and adjacent a second edge of the band. The band is then formed into a loop so that it may be positioned over a pipe joint. Means for tensioning the band, such as bolts or a tensioning band, force the band tightly against the pipe joint to cause the first series of indentations to engage the troughs of one section of corrugated pipe and the second series of indentations to engage the troughs in a second section of corrugated pipe. In this manner, the two sections of corrugated pipe are securely fastened to each other and are held in abutting relation by the coupling of the present invention. Modifications may be made in the above-defined structure to enable the coupling of the present invention to be used on either annularly corrugated pipe or helically corrugated pipe; further, by proper choice of indentation spacing, the coupling of the present invention may be used to join a section of annularly corrugated pipe to a section of helically corrugated pipe.

The present invention may more completely be described by reference to the accompanying drawings in which:

FIGURE 1 is a schematic illustration of two sections of helically corrugated pipe useful for illustrating the problems involved in joining such pipe.

FIGURE 2 is a schematic end elevation of a portion of the helical pipe of FIGURE 1, useful for illustrating the necessity for aligning the trough.

FIGURE 3 is an isometric view of a prior art pipe coupling for joining two sections of helically corrugated pipe.

FIGURE 4 is a front and side elevational view of a prior art pipe coupling for coupling large size helically corrugated pipe.

FIGURE 5 is an illustration of a partly constructed pipe coupling showing the manner in which the pipe coupling of the present invention is manufactured.

FIGURE 6 is a front and side elevational view of a pipe coupling constructed in accordance with the teaching of the present invention.

FIGURE 7 is a side elevational view, partly in section, showing a pipe coupling constructed in accordance with the teaching of the present invention in place on a pipe joint.

FIGURE 8 is an illustration of a modification of the pipe coupling, partly constructed, shown in FIGURE 5.

FIGURE 9 is an illustration of the modified structure shown in FIGURE 8 in place, and partly in section, on a pipe joint.

FIGURES 10 and 11 are illustrations of another embodiment of the pipe coupling of the present invention.

FIGURE 12 is an illustration showing various tensioning means for use in connection with the pipe coupling of the present invention.

FIGURE 13 is an illustration showing the pipe coupling of the present invention, partly in section, securing a section of annularly corrugated pipe to a section of helically corrugated pipe.

FIGURE 14 is an isometric view of a preferred coupling plate for tensioning the pipe coupling of the present invention.

FIGURE 15 is a side elevational view showing a pair of coupling plates of the type shown in FIGURE 14 having an indented band threaded through the slots of the coupling plates.

Referring to FIGURES 1 and 2, helically corrugated pipe sections 10 and 11 are shown in opposing relation with their corresponding faces 12 and 13 appropriately aligned for matching. Before a match can be made, and before a coupling may be placed over the joint, the troughs of the corrugations of each of the sections 10 and 11 must be mated to prevent gross flow at the coupling. To illustrate this problem, reference may be had to FIGURE 2 with the assumption that water is flowing in the direction shown by the arrow 15 in FIGURE 1 and in the direction into the drawing of FIGURE 2. The pipe section 11 will have an edge presented to the water as shown at 13 in FIGURE 2. However, the water will be flowing through corrugated pipe 10 before it reaches the surface 13 and will be confined by the shape of the surface 12. As shown in FIGURE 2, the sections 10 and 11 are not aligned since the troughs 18 of the corrugated pipe 11 are not aligned with the troughs 19 of corrugated pipe 10. Thus, the water flowing between the troughs 19 of the corrugated pipe 10 will be directed to the outside surface of the troughs 18 of the corrugated pipe 11. Therefore, openings will be presented around the periphery of the pipe joint such as the openings at 20 and 21. If either of the pipe sections 10 or 11 is rotated about its axis, to thereby align the troughs 18 with the troughs 19, then the openings such as those at 20 and 21 will no longer exist and the pipe joint will appear, to the water, to be a mere extension of the section 10 without openings for gross flow. It will be obvious, however, that unless a sealing material such as plastic or other sealing compound is used, the coupling will nevertheless permit slight leakage; athough slight leakage may be present, in most corrgulated pipe applications the slight leakage through such a coupling is unobjectionable and only gross flow need be avoided. However, even in those applications where slight leakage may be tolerated, a tight fit, to thus reduce leakage, is desirable.

The prior art means for coupling sections 10 and 11 of FIGURE 1 together are shown in FIGURES 3 and 4. FIGURE 3 is a prior art coupling intended for use in connection with helically corrugated pipe of small diameters. The coupling consists of two sections 25 and 26, each formed of one-half cylinder of corrugated pipe. The cylinder halves are formed integral with flanges 28 and 29 to permit clamping of both halves over the pipe joint. The sections 25 and 26 are extremely rigid and inflexible and require considerable effort to mount onto a joint. The usual method of applying the pipe coupling of FIGURE 3 is to mount the coupling over the joint and loosely clamp it in place. Then one of the pipe sections is twisted until it is thought that the troughs of the pipe sections are aligned. The two sections are then clamped to provide an assembled coupling. However, because of the rigidity caused by the corrugations on the coupling of FIGURE 3, it is very difficult to tell when the troughs are aligned and thus when to clamp the coupling in place. In addition, the coupling shown in FIGURE 3 is expensive to manufacture and requires expensive equipment for properly corrugating and also requires a set of four bolts for each joint. The prior art device of FIGURE 4 includes the same problems discussed above for the prior art device of FIGURE 3; however, the device of FIGURE 4 is intended for use in connection with pipes of large diameter. The rigidity, caused by the corrugations, renders the coupling extremely cumbersome.

The coupling of the present invention overcomes the difficulties of the prior art by providing a readily manufactured and only semi-rigid pipe coupling. The device of the present invention may be manufactured from flat rectangular bands of semi-rigid material such as galvanized steel and, referring to FIGURE 5, the bands 35 are then indented to provide two series of indentations. The first series of indentations comprising indentations 36 is formed along one side of the band axially displaced from the center line 37 of the band. The second series of indentations 38 is spaced on the opposite side of the center line 37. Each indentation joins the band by a fillet that is complementary to the shape of the crest of the corrugation. The band 35 is then formed into a circular shape such as shown in FIGURE 6. The ends of the band may be bent at right angles to the surface of the band to form flanges 40 and 41 for tightening the coupling over a joint. The lack of corrugations on the coupling of the present invention, and the provision of indentations such as shown in FIGURES 5 and 6, enable it to be flexed and manipulated with substantially greater ease than prior art devices. Further, no complicated or expensive machines are required for producing the coupling of the present invention in contrast to the corrugated couplings of the prior art. The coupling of the present invention, such as shown in FIGURES 5 and 6, may be used to couple helically corrugated pipe in a manner shown in FIGURE 7.

Referring to FIGURE 7, a section of helical pipe 45 is positioned in abutting relation with a second section of helical corrugated pipe 46 (shown in FIGURE 7 in dashed lines to permit the indentations of the coupling to be seen). The coupling 47 is placed over the joint and the indentations 48 engage the troughs of the respective pipe sections. Since the pipe coupling is readily flexible, the coupling may be mounted on the joint and positioned roughly by hand; the pipe sections may be jostled until the troughs of the corresponding corrugations are in alignment and the coupling may then be tightened. The series of indentations provided in the coupling of the present invention may be two simple parallel columns as shown in FIGURE 5; similarly, to accommodate the helix angle of a helically corrugated pipe, the indentations may be successively offset from each other. As shown in FIGURE 7, the indentations 49 and 50 are slightly offset so that each indentation will fall into a trough of the helically corrugated pipe. It may be noted that the pipe coupling of the present invention is made from a single strap or band of semi-rigid material and is a one-piece coupling regardless of the size of pipe with which it is to be used. The extreme rigidity given to a coupling by corrugating, such as shown in FIGURES 3 and 4, necessitates the use of a two-piece coupling such as shown in FIGURE 3 when the diameter of pipe to be coupled or joined is small. The coupling of the present invention such as shown in FIGURE 7 is a one-piece, relatively flexible coupling that is easily manipulated and greatly facilitates the joining of pipe sections. When the pipe diameters become large, the pattern of the indentations on the band may vary.

Referring to FIGURE 8, a band of semi-rigid material 55 is shown having a first and a second series of indentations 56 and 57 respectively. It may be noted that each of these series of indentations comprises indentations that are slightly offset from the succeeding or preceding indentations. The purpose of the form of the indentations of each of the series of indentations may be explained by reference to FIGURE 9. Helically corrugated pipe sections 60 and 61 are of large diameter and are therefore usually formed with a small helix angle α. Since the troughs of the respective corrugated pipes adjacent the joint between the pipes will not be in a plane perpendicular to the axis of the pipe, it is therefore desirable to axially displace successive indentations so that the indentations fall into troughs in addition to the trough adjacent the pipe joint. A variety of arrangements may be implemented to provide the necessary gripping force at the joint and also to block the gross flow of liquid from the joint along any trough. The pattern of indentations is therefore not critical and is exceedingly flexible. The pattern may be chosen in accordance with the particular application for which the specific coupling is to be used.

In those instances where very large corrugated pipe is being coupled, it may be found that the depth of the troughs of the pipe require more than the ordinary depth of an indentation to seal the trough against gross liquid flow. In those instances, the modification shown in FIGURES 10 and 11 may be used. Referring to FIGURES 10 and 11, the indentations include a hole 65 punched in the band 66 to provide a depending tab 67 that extends from the band 66 into engagement with the trough 68. The shape of the respective tabs may be made to conform to the shape of the trough and may extend from the band a distance slightly greater than the depth of the trough. In this manner, tensioning forces on the band to tighten the band against the corrugated pipes at the pipe joint will cause the tabs to slightly deform and thereby seal against the troughs.

Any convenient means may be used to tension the pipe coupling of the present invention to thereby secure the coupling and the pipe joint. FIGURE 12 illustrates three such methods. The tensioning means shown at 70 is a conventional flange formed integral with the indented band to permit a bolt to be passed through holes in the flange and drawn up tightly. The tensioning means shown at 71 includes a pair of metal angles or angleirons 72 welded or otherwise secured to the band 73 for receiving bolts to tighten the coupling. The advantage of the tensioning means shown at 71 is that the band 73 may be lapped to permit more complete sealing of the joint and has the further advantage that the angleirons 72 are somewhat stronger than the integral flanges formed as illustrated at 70. The third illustrated tensioning means is the utilization of a tensioning band such as that shown at 75 that encircles the detended band 76 and holds the latter, in overlapped fashion, tightly in engagement with the pipe joint.

The pipe coupling of the present invention may more readily be secured to the pipe joint through the use of the tensioning means shown in FIGURES 14 and 15. Referring to those figures, the tensioning means shown therein includes a pair of coupling plates 95 and 96, each including holes 97 and 98 respectively, for receiving tensioning devices such as bolts, clamps, etc. Each of the coupling plates also includes an elongated slot such as the slot shown at 100 for receiving the end of the indented band. As shown in FIGURE 5, the end 105 of the band passes through the slot 100 and extends under the coupling plate 96. The end 106 of the band extends through the slot 101 and terminates flush with the face 107 of the plate 96. Thus, bolts may be passed through the holes 97 and 98 and the two coupling plates 95 and 96 drawn toward each other while the end 106 of the band slides over the end 105. The band would thus become tensioned while the frictional force of the ends of the band passing through the slots 100 and 101 would insure that the coupling plates properly gripped the band. The tensioning means shown in FIGURES 14 and 15 increases the strength at the ends of the bands and provides an inexpensive means for tensioning the indented band without decreasing the efficacy of the pipe coupling.

One of the principal advantages of the pipe coupling of the present invention is the fact that it may be used to join annularly corrugated pipe to helically corrugated pipe. A pipe coupling constructed in accordance with the teachings of the present invention to achieve this type of coupling action is shown in FIGURE 13. Referring to FIGURE 13, a section of annularly corrugated pipe 80 is shown in abutting relation with a section of helically corrugated pipe 81. The pipe coupling 82 is provided with a first series of indentations 84 comprising two columns of indentations spaced apart the distance between successive troughs in the pipe section 80. Thus, the indentations 84 extend into and engage the troughs 85 and 86 of the pipe section 80. A second series of indentations 90 is provided on the band axially spaced from the pipe joint and are on the opposite side of the pipe joint from the indentations 84. The indentations 90 are positioned to engage the troughs of the helically corrugated pipe section 81. The indentations 90 may be offset relative to each other in a manner described previously, in connection with FIGURES 7, 8, and 9.

The advantages to be gained by the pipe coupling of the present invention become apparent when the rigidity, expense and inconvenience afforded by the prior art couplings are considered and when the impossibility of joining an annularly corrugated pipe section to a helically corrugated pipe section are considered. The pipe coupling of the present invention may be provided with indentations that simply form two columns, the first of which engages the trough of an annularly corrugated pipe section and the second of which engages a corresponding trough of a mating annularly corrugated pipe section. In this manner, the two pipe sections are held in abutting relation and are securely locked in position. Further, by appropriate arrangement of indentations, any type of corrugated pipe may be secured by the coupling to any other type of corrugated pipe. For example, as is sometimes the case, manufacturers have standard trough to trough and trough depth dimensions which do not exactly correspond to those of other manufacturers of the same size pipe. It is not infrequent that corrugated pipe from various manufacturers have been purchased for a single application. The manufacturer of couplings must therefore provide couplings for all the variety of corrugation dimensions and the user must be careful to have sufficient numbers of the various manufacturers' pipe sections so that it will not become necessary to couple one manufacturer's pipe to another. The coupling of the present invention obviates these difficulties and provides a coupling with unusual application flexibility and a substantially lower price.

I claim:

1. A pipe joint comprising: a pair of substantially axially aligned and abutting lengths of helically corrugated pipe; each length of pipe having at least three helical corrugations; said lengths positioned relative to each other to align the helical corrugations of one of said lengths with the helical corrugations of the other of said lengths to form substantially continuous corrugations across said joint; a coupling band encircling the adjacent ends of said lengths of pipe, said band being so sized and constructed of a material such that it can be readily flexed in a plane perpendicular to the axis of said pipe and having at least two circumferential rows of indentations, there being a number of indentations to correspond to the number of troughs in the corrugations at the abutting ends of said pipe lengths, the indentations of each row of indentations being so spaced circumferentially and axially of said band that said indentations engage in the troughs of each of said helical corrugations of a different one of said lengths of pipe; each indentation conforming to and filling the trough of said corrugation that it engages, said indentations joined to said band by a fillet complementary in size and shape to the size and shape of the crest of said corrugations, said band also engaging the top of each corrugation between said indentations to thereby substantially prevent fluid passage between said pipe lengths and said band; and means for tensioning said band to retain said band in place on said joint.

2. The pipe joint defined in claim 1 wherein more than one indentation are provided for each corrugation in said length of pipe.

3. The pipe joint defined in claim 1 wherein said indentations of each row of indentations are each axially offset from the circumferentially adjacent indentations.

4. A tensionable, flexible coupling band adapted to encircle the adjacent ends of substantially abutting lengths of corrugated pipe, one of said lengths being annularly corrugated pipe and the other of said lengths being helically corrugated, said band having at least two series of indentations, the first of which comprises a circumferential row of indentations arranged to extend into the corrugations of said annularly corrugated lengths, and the second of which comprises a plurality of indentations spaced apart by a distance such that adjacent indentations extend into different corrugations of said helically corrugated length, said indentations having a shape substantially conforming to the corrugations of said pipe to obstruct fluid flow therethrough.

References Cited by the Examiner

UNITED STATES PATENTS

| | | | |
|---|---|---|---|
| 920,169 | 5/1909 | Neuberth | 285—419 |
| 1,203,546 | 10/1916 | Parsons | 285—391 |
| 1,264,446 | 4/1918 | Sears. | |
| 1,587,327 | 6/1926 | Johnson | 285—116 |
| 1,771,522 | 7/1930 | Berge. | |

FOREIGN PATENTS

| | | |
|---|---|---|
| 331,331 | 7/1930 | Great Britain. |
| 570,815 | 7/1945 | Great Britain. |

CARL W. TOMLIN, *Primary Examiner.*

T. A. LISLE, *Assistant Examiner.*